(12) United States Patent
Tang et al.

(10) Patent No.: US 11,070,125 B2
(45) Date of Patent: *Jul. 20, 2021

(54) VOLTAGE REGULATOR HAVING SELF-TEST MODE

(71) Applicant: Infineon Technologies Austria AG, Villach (AT)

(72) Inventors: Benjamim Tang, Rancho Palos Verdes, CA (US); Jinghong Guo, Shanghai (CN); Harrison Hu, Guangdong (CN); Tim Ng, Monterey Park, CA (US); Mattia Oddicini, Redondo Beach, CA (US); Herbert Zojer, Torrance, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,884

(22) Filed: Oct. 29, 2019

(65) Prior Publication Data

US 2020/0064878 A1 Feb. 27, 2020

Related U.S. Application Data

(63) Continuation of application No. 16/107,528, filed on Aug. 21, 2018, now Pat. No. 10,481,626.

(51) Int. Cl.
*H02M 3/158* (2006.01)
*H02M 1/32* (2007.01)
(Continued)

(52) U.S. Cl.
CPC .............. *H02M 1/32* (2013.01); *H02H 9/045* (2013.01); *H02M 3/1584* (2013.01);
(Continued)

(58) Field of Classification Search
CPC .. H02M 1/32; H02M 2001/325; H02M 3/158; H02M 3/1584; H02M 2003/1586
See application file for complete search history.

(56) References Cited

U.S. PATENT DOCUMENTS

6,836,100 B2  12/2004  Egan et al.
7,492,134 B2  2/2009  Tang et al.
(Continued)

*Primary Examiner* — Alex Torres-Rivera
(74) *Attorney, Agent, or Firm* — Murphy, Bilak & Homiller, PLLC (57) ABSTRACT

A fault-tolerant multiphase voltage regulator includes a plurality of power stages, each of which is configured to deliver a phase current to a processor, and a controller. The controller is configured to: control the plurality of power stages to regulate an output voltage provided to the processor; detect and disable a faulty power stage; generate a throttling signal to indicate that one or more of the power stages is faulty and disabled; communicate the throttling signal to the processor over a physical line running between the processor and the controller; and place the multiphase voltage regulator in a self-test mode in which the processor is operated at a known computational load and the controller operates each power stage independently to determine if any of the power stages is faulty under the known computational load. A corresponding method of operating a fault-tolerant power distribution system is also described.

20 Claims, 3 Drawing Sheets

(51) Int. Cl.
*H02H 9/04* (2006.01)
*G05F 1/62* (2006.01)
*G05F 1/46* (2006.01)
*H02H 9/02* (2006.01)

(52) U.S. Cl.
CPC .............. *G05F 1/463* (2013.01); *G05F 1/62* (2013.01); *H02H 9/02* (2013.01); *H02M 2001/325* (2013.01); *H02M 2001/327* (2013.01)

(56) References Cited

U.S. PATENT DOCUMENTS

| | | | |
|---|---|---|---|
| 7,595,615 B2 | 9/2009 | Li et al. | |
| 8,274,265 B1 | 9/2012 | Khanna et al. | |
| 8,829,872 B1 | 9/2014 | Pierson et al. | |
| 8,836,306 B2 | 9/2014 | Khanna et al. | |
| 8,879,217 B2 | 11/2014 | Tang et al. | |
| 8,901,909 B2 | 12/2014 | Khanna et al. | |
| 9,030,047 B2 | 5/2015 | Barus et al. | |
| 9,298,241 B2 | 3/2016 | Barus et al. | |
| 9,543,838 B2 | 1/2017 | Babazadeh et al. | |
| 2004/0201931 A1 | 10/2004 | Korcharz et al. | |
| 2006/0294398 A1 | 12/2006 | Morris et al. | |
| 2007/0226557 A1 | 9/2007 | Fuseya | |
| 2008/0265869 A1* | 10/2008 | Babb | G01R 31/40 324/86 |
| 2011/0051479 A1 | 3/2011 | Breen et al. | |
| 2012/0086416 A1 | 4/2012 | Kudo et al. | |
| 2014/0077781 A1 | 3/2014 | Murakami et al. | |
| 2014/0232420 A1* | 8/2014 | Luo | H02M 3/1584 324/750.01 |
| 2014/0265563 A1 | 9/2014 | Schrader | |
| 2015/0002112 A1* | 1/2015 | Tang | H02H 7/1213 323/271 |
| 2017/0170714 A1 | 6/2017 | Nguyen et al. | |
| 2018/0309363 A1* | 10/2018 | Tsutsui | H02M 3/33569 |
| 2018/0348309 A1* | 12/2018 | Ou Yang | G01R 31/2817 |

\* cited by examiner

VOLTAGE REGULATOR HAVING SELF-TEST MODE

BACKGROUND

Processors and other highly integrated electronic components require accurate voltage supplies capable of supplying large amounts of current and power, while maintaining tight voltage regulation and being subject to tight implementation area constraints. Multiphase voltage regulators, such as multiphase buck converters, are widely used to provide high current to such loads, providing a parallel arrangement that can be phase interleaved for fast dynamic response to load, line, and voltage target changes. Despite the parallel architecture, conventional multiphase buck converters are not well-suited for phase redundant operation, where the converter can operate robustly even in the presence of a non-catastrophic failure of one or more phases, while maintaining output regulation and some degraded capability to partially provide output current or power up to some fraction of the full capability of a system with no failed phases.

Thus, there is a need for a mechanism that enables multiphase voltage regulator operation with one or more non-catastrophic faulty phases.

SUMMARY

According to an embodiment of a fault-tolerant multiphase voltage regulator, the voltage regulator comprise a plurality of power stages, each of which is configured to deliver a phase current to a processor, and a controller. The controller is configured to: control the plurality of power stages to regulate an output voltage provided to the processor; detect and disable a faulty power stage; generate a throttling signal to indicate if one or more of the power stages is faulty and disabled; and communicate the throttling signal to the processor over a physical line running between the processor and the controller.

In an embodiment, the controller is configured to continue regulating the output voltage provided to the processor even if one or more power stages of the plurality of power stages is detected as being faulty and disabled.

Separately or in combination, the controller may be configured to communicate with a system manager independent of communicating with the processor, to indicate to the system manager if one or more power stages of the plurality of power stages is detected as being faulty and disabled.

Separately or in combination, the controller may be configured to generate the throttling signal also in response to an overtemperature condition, so that the throttling signal is generated and communicated to the processor over the same physical line used by the controller to indicate to the processor if any of the following conditions occur: a power stage is detected as being faulty and disabled; and an overtemperature condition.

Separately or in combination, the controller may be configured to generate the throttling signal also in response to an overvoltage condition, an undervoltage condition or an overcurrent condition, so that the throttling signal is generated and communicated to the processor over the same physical line used by the controller to indicate to the processor if any of the following conditions occur: a power stage is detected as being faulty and disabled; an overvoltage condition; an undervoltage condition; and an overcurrent condition.

Separately or in combination, the controller may be configured to generate the throttling signal also in response to an overtemperature condition, an overvoltage condition, an undervoltage condition or an overcurrent condition, so that the throttling signal is generated and communicated to the processor over the same physical line used by the controller to indicate to the processor if any of the following conditions occur: a power stage is detected as being faulty and disabled; an overtemperature condition; an overvoltage condition; an undervoltage condition; and an overcurrent condition.

Separately or in combination, the controller may be configured to place the multiphase voltage regulator in a self-test mode in which the processor is operated at a known computational load and the controller operates each power stage independently to determine if any of the power stages is faulty under the known computational load.

According to an embodiment of a method of operating a fault-tolerant multiphase voltage regulator having a plurality of power stages, each of which is configured to deliver a phase current to a processor, the method comprises: controlling the plurality of power stages to regulate an output voltage provided to the processor; detecting and disabling a faulty power stage; generating a throttling signal to indicate if one or more of the power stages is faulty and disabled; and communicating the throttling signal to the processor over a physical line running between the processor and the controller.

In an embodiment, the method further comprises communicating with a system manager independent of communicating with the processor, to indicate to the system manager if one or more power stages of the plurality of power stages is detected as being faulty and disabled.

Separately or in combination, the method may further comprise generating the throttling signal also in response to an overtemperature condition, so that the throttling signal is generated and communicated to the processor over the same physical line used to indicate to the processor if any of the following conditions occur: a power stage is detected as being faulty and disabled; and an overtemperature condition.

Separately or in combination, the method may further comprise generating the throttling signal also in response to an overvoltage condition, an undervoltage condition or an overcurrent condition, so that the throttling signal is generated and communicated to the processor over the same physical line used to indicate to the processor if any of the following conditions occur: a power stage is detected as being faulty and disabled; an overvoltage condition; an undervoltage condition; and an overcurrent condition.

Separately or in combination, the method may further comprise generating the throttling signal also in response to an overtemperature condition, an overvoltage condition, an undervoltage condition; or an overcurrent condition, so that the throttling signal is generated and communicated to the processor over the same physical line used to indicate to the processor if any of the following conditions occur: a power stage is detected as being faulty and disabled; an overtemperature condition; an overvoltage condition; an undervoltage condition; and an overcurrent condition.

Separately or in combination, the method may further comprise placing the multiphase voltage regulator in a self-test mode in which the processor is operated at a known computational load and each power stage is operated independently to determine if any of the power stages is faulty under the known computational load.

According to an embodiment of a fault-tolerant power distribution system, the system comprises: a processor; a multiphase voltage regulator comprising a plurality of power stages, each of which is configured to deliver a phase current to the processor, and a controller configured to: control the plurality of power stages to regulate an output voltage provided to the processor; detect and disable a faulty power stage; generate a throttling signal to indicate if one or more of the power stages is faulty and disabled; and communicate the throttling signal to the processor over a physical line running between the processor and the controller; and a system manager in independent communication with the multiphase voltage regulator and the processor.

In an embodiment, the system manager is configured to reduce a computational load of the processor if the controller of the multiphase voltage regulator indicates one or more power stages of the plurality of power stages is detected as being faulty and disabled.

Separately or in combination, the system manager may be configured to increase the computational load of the processor after the multiphase voltage regulator reports a faulty power stage, shuts down and repowers up again.

Separately or in combination, the system manager may be configured to direct the multiphase voltage regulator to perform a self-test mode to confirm whether any of the power stages are faulty.

Separately or in combination, the system manager may be configured to increase the computational load of the processor if the multiphase voltage regulator indicates the self-test mode confirmed none of the power stages are faulty.

Separately or in combination, the system manager may be configured to shut down the processor and the multiphase voltage regulator if the multiphase voltage regulator indicates the self-test mode confirmed that one or more of the power stages is faulty.

According to an embodiment of a method of operating a fault-tolerant power distribution system having a processor, a multiphase voltage regulator comprising a plurality of power stages, each of which is configured to deliver a phase current to the processor, and a system manager in independent communication with the multiphase voltage regulator and the processor, the method comprises: controlling the plurality of power stages at the multiphase voltage regulator to regulate an output voltage provided to the processor; detecting and disabling a faulty power stage at the multiphase voltage regulator; generating a throttling signal at the multiphase voltage regulator to indicate if one or more of the power stages is faulty and disabled; communicating the throttling signal from the multiphase voltage regulator to the processor over a physical line running between the processor and the controller; and managing a computational load of the processor by the system manager based on feedback from the processor and the multiphase voltage regulator.

In an embodiment, managing the computational load of the processor by the system manager may comprise reducing the computational load of the processor if the multiphase voltage regulator indicates one or more power stages of the plurality of power stages is detected as being faulty and disabled.

Separately or in combination, the method may further comprise increasing, via the system manager, the computational load of the processor after the multiphase voltage regulator reports a faulty power stage, shuts down and repowers up again.

Separately or in combination, the method may further comprise directing, via the system manager, the multiphase voltage regulator to perform a self-test mode to confirm whether any of the power stages are faulty.

Separately or in combination, the method may further comprise increasing, via the system manager, the computational load of the processor if the multiphase voltage regulator indicates the self-test mode confirmed none of the power stages are faulty.

Separately or in combination, the method may further comprise shutting down the processor and the multiphase voltage regulator, via the system manager, if the multiphase voltage regulator indicates the self-test mode confirmed that one or more of the power stages is faulty.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a mechanism that enables multiphase voltage regulator (VR) operation with one or more non-catastrophic faulty power stages, by recognizing a non-catastrophic power stage fault as a reduction in capability and not a failure. Allowing continued operation of a multiphase voltage regulator (VR) with one or more non-catastrophic power stage faults improves power supply robustness in complex computing systems, such as server farms and datacenters, thereby maintaining uptime and minimizing system impact from component failures.

Sophisticated multiphase VR controllers and VR power stages provide a high level of fault monitoring and telemetry, which allow VR operation outside the expected range to be detected. Many failure modes are not immediately catastrophic in that complete VR failure is not imminent, and instead is often preceded by operation outside the nominal expected range. By utilizing fault monitoring and telemetry information already available to a multiphase VR controller, and by leveraging the parallel nature of a multiphase VR controller which include phase redundancy, degraded VR operation may be tolerable at lower output current and power levels with reduced transient capability, and may be provided by operating the VR with a lower number of power stages.

Methods for monitoring the multiphase VR, particularly the VR power stages, may be used to identify components operating outside the nominal range but which do not have a catastrophic failure. Notification of such degraded operation may be used by the system to shift computational load away from a degraded node, offering the opportunity to shift computations away from a problematic node in a systematic manner before shutting down the faulty node. This improves operational efficiency and fault tolerance of the overall system without significant additional cost.

Degraded operation of a multiphase VR with one or more non-catastrophic power stage faults may be preferable over a complete shutdown, allowing the system to determine an optimal response. For example, in parallel computing systems, workload can be shifted away from one processor, allowing the system to continue operation with minimal impact from the faulty node. Degraded operation of the corresponding multiphase VR may be sufficient to allow the processor to support the needed resources for transitioning the workload, allowing an intelligent system to control the transition process and provision the system to allow eventual shutdown without impacting the workload.

If the event of a catastrophic failure within a multiphase VR, the VR cannot continue safe operation and instead must be disabled immediately to prevent severe damage. For example, a high-side short in a power stage may cause a severe overvoltage or overcurrent condition which may damage the power stage and possibly prevent a hazard. A low-side short in a power stage may similarly cause a severe overvoltage or overcurrent condition which may damage the power stage and possibly prevent a hazard. The multiphase VR is disabled immediately in the event of such a catastrophic fault.

However, many faults detected by sophisticated fault monitoring and telemetry circuitry are not catastrophic. Non-catastrophic faults do not result in immediate damage to the multiphase VR. For example, sophisticated fault monitoring and telemetry circuitry may detect non-catastrophic faults such as: transitory overheating due to dynamic conditions; transitory overcurrent due to dynamic conditions; power stage overheating due to increased switching and/or resistive losses and degraded operation; boot capacitance degradation and inability to fully switch a high-side power stage device; power stage losses due to increased leakage current from a floating domain; driver failure such as a faulty input buffer or level shifters, and inability to switch one or both of the power devices; and/or current sense failure. If the input supply power delivery capability is exceeded, this may result in a loss of regulation or brownout condition, causing a possible overvoltage or undervoltage condition at the input or output of the regulator. In each case, the multiphase VR described herein may continue to operate in the presence of one or more non-catastrophic faults by disabling non-functional or dis-functional power stages, and operating with the remaining power stages.

Embodiments described herein provide a mechanism for disabling a power stage when a non-catastrophic power stage failure is detected, and operating with a reduced number of power stages. Embodiments described herein provide a signalling scheme so that the VR controller may notify the system that the multiphase VR is operating in a degraded condition, with a reduced number of enabled power stages. The signalling may be done over a serial bus, with an interface signal such as a FAULT signal, etc. Embodiments described herein provide a scheme to throttle the load, so that load current and power requirements are reduced and can be more easily met by the multiphase VR operating in a degraded condition. Embodiments described herein provide a stress test mode whereby the load is operated under known conditions and the VR controller verifies individual power stage and processor operation, to confirm whether a hard or intermittent power stage failure has occurred. The stress test mode may be executed as part of a diagnostic routine performed after a fault is detected, but may also be executed at powerup or even during normal operation.

Figure 1:
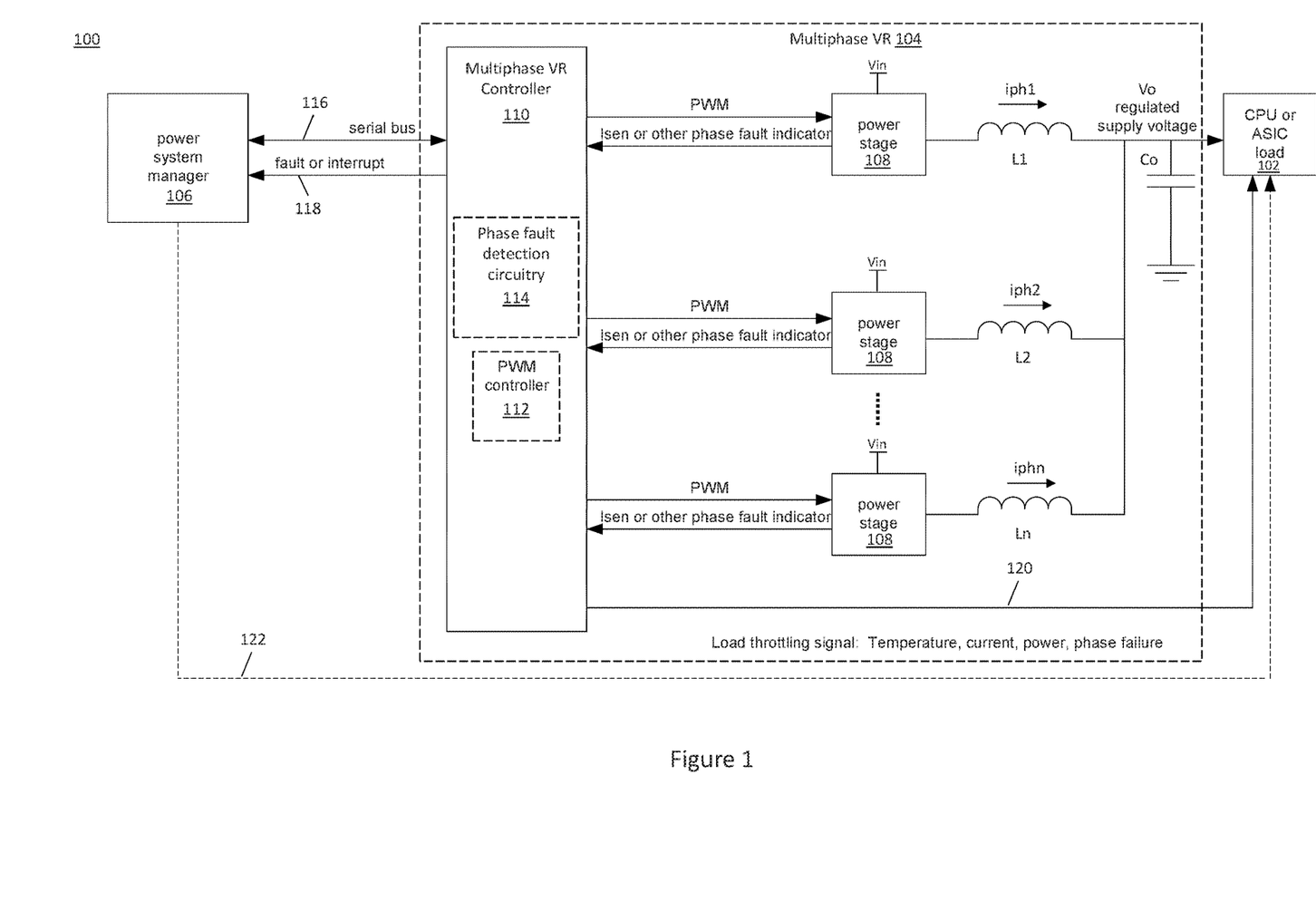
FIG. 1 illustrates a block diagram of an embodiment of a fault-tolerant power distribution system.

FIG. 1 illustrates an embodiment of a fault-tolerant power distribution system 100 that includes a processor 102, a multiphase VR 104 for powering the processor 102, and a system manager 106. The system manager 106 is in independent communication with the multiphase VR 104 and the processor 102. That is, the system manager 106 may communicate with the multiphase VR 104 separately or independently from communicating with the processor 102. The system manager 106 manages all resources of the power distribution system 100, including the multiphase VR 104 and the processor 102. One processor 102 and one multiphase VR 104 are shown in FIG. 1 for ease of illustration only. However, a typical power distribution system, such as a server farm or datacenter, has many processors 102 and corresponding multiphase VRs 104 for powering the processors 102 and related circuitry (not shown) such as memory, etc. The embodiments described herein apply to any type of power distribution system that has a plurality of processors, a plurality of multiphase VRs for powering the processors, and a system manager in independent communication with the multiphase VRs and processors.

The term "processor" as used herein means an electronic load that performs some type of data handling and/or computation in the system 100. Such processor-type loads may include, but are not limited to, microprocessors, graphic processors, network processors, AI (artificial intelligence) processors, embedded processors, ASICs (application-specific integrated circuit) designed with data handling and/or computational capability, DSPs (digital signal processors), etc. The processor 102 may be implemented as a single chip (die), as a set of chips, as a system on a board, as a system in a package, etc.

Each multiphase VR 104 included in the fault-tolerant power distribution system 100 has a plurality of power stages 108, also referred to herein as phases, each of which is configured to deliver a phase current iphx to the processor 102. The power stages 108 may be connected to the processor 102 via a respective inductor Lx and via an output capacitor Co, which can be physically implemented as a single capacitor or a bank of capacitors. Details of the power stages 108 are not shown, but should be well understood by one of ordinary skill in the art. For example, in the context of a multiphase buck converter, the power stages 108 may include respective high-side and low-side switch devices connected between an input voltage (Vin) and a reference potential such as ground. The high-side and low-side switch devices are coupled at a common node to the corresponding output inductor Lx, and the power stages 108 may also include drive circuitry configured to drive the respective gates of the high-side and low-side switch devices of that power stage 108. The power stages 108 are configured to output a phase current iphx to the processor 102 through the corresponding inductor Lx in response to a control signal such as a PWM (pulse width modulation) input to the power stage 102.

The multiphase VR controller 110 generates the control signals input to the power stages 108, and sets the switching frequency of the control signals. For example, the VR controller 110 may include PWM circuitry 112 for generating the PWM control signals provided to the respective power stages 108. The controller 110 controls the power stages 108, via the control signals, to regulate the output voltage Vo provided to the processor 102.

The multiphase VR controller 110 also includes phase fault detection circuitry 114 which has fault monitoring and telemetry functionality for detecting and disabling a faulty power stage 108, e.g., by monitoring the regulator input and output voltages, input and output currents, phase currents, and/or device or sensor temperatures. The multiphase VR 104 may be tested after installation to ensure power stage operation is within an expected range, after a detected power stage failure to determine if the failure was temporary in nature and has recovered and/or on demand to evaluate regulator health periodically. The phase fault detection circuitry 114 may be configured for runtime detection of faulty power stages based on current sense waveforms, current balance information, current limits, overtemperature conditions, etc. For example, the phase fault detection circuitry 114 may provide overcurrent protection (OCP) whereby the positive current through a high-side device of a power stage 108 is limited when excessive positive current is detected, e.g., by forcing the high-side device off.

Separately or in combination, the phase fault detection circuitry 114 may provide negative phase current protection whereby the negative current through a low-side device of a power stage 108 is limited when excessive negative current is detected, e.g., by forcing the low-side device off. Separately or in combination, the phase fault detection circuitry 114 may provide power stage fault detection based on current measurements for two or more phases and by comparing the sawtooth ripple pattern. Power stage failure is detected in this case when the phase current waveform does not have the expected ripple pattern following the corresponding PWM waveform. Separately or in combination, the phase fault detection circuitry 114 may provide phase shedding operation whereby the multiphase VR 104 operates with a reduced number of power stages 108. Separately or in combination, the phase fault detection circuitry 114 may disable a faulty power stage 108, allowing the multiphase VR 104 to operate with some power stages 108 disabled. The phase fault detection circuitry 114 may set status and/or fault indicators, to provide information to the system manager 106 about the operational status of the multiphase VR 104. The information may be communicated over a serial bus 116, for example, or another type of fault or interrupt interface 118 between the system manager 106 and the multiphase VR controller 110.

The few examples explained above are just a few illustrations of the functionality which may be provided by the phase fault detection circuitry 114. The phase fault detection circuitry 114 may also detect if the load current is outside an expected range and implement an over current protection (OCP) scheme in response. Separately or in combination, the phase fault detection circuitry 114 may detect if the temperature of any power stage 108 exceeds an expected range, e.g., due to overcurrent, unexpected increase in power losses, unexpected environmental conditions (e.g. temperature, airflow), etc. Separately or in combination, the phase fault detection circuitry 114 may detect a current imbalance across the power stages 108, detect a power stage failure (e.g. high-side short, low-side short, driver faults, boot capacitor failure, overcurrent failure, overtemperature failure, etc.), detect input power brownout, etc.

Regardless of the specific fault detection capability of the phase fault detection circuitry 114, the multiphase VR controller 110 recognizes non-catastrophic power stage faults as a reduction in capability and not a failure. To this end, the multiphase VR controller 110 generates a throttling signal to indicate if one or more of the power stages power stages are faulty and disabled, and communicates the throttling signal to the processor 102 over a physical line 120 running between the processor 102 and the VR controller 110. The processor 102 throttles itself in response to the throttling signal, e.g., by reducing its clock speed.

The multiphase VR controller 110 may continue regulating the output voltage Vo provided to the processor 102 even if one or more power stages power stages 108 of the multiphase VR 104 are detected as being faulty and disabled. The multiphase VR controller 110 may communicate with the system manager 106 independent of communicating with the processor 102, to indicate to the system manager 106 if one or more power stages 108 is detected as being faulty and disabled. Accordingly, the processor 102 may throttle its operation in response to the throttling signal which provides adequate time for the system manager 106 to determine an optimal response. For example, the system manager 106 may shift some or all of the workload from the affected processor to another processor within the system 100, allowing the system 100 to continue operation with minimal impact from the faulty node. The system manager 106 may control the transition process and provision the system 100 to allow eventual shutdown of the faulty node without impacting the overall workload.

As described above, the multiphase VR controller 110 generates the throttling signal communicated to the processor 102 if one or more power stages 108 is detected as being faulty and disabled. The multiphase VR controller 110 may generate the throttling signal under other conditions.

In one embodiment, the multiphase VR controller 110 generates the throttling signal also in response to an overtemperature condition (OTP). According to this embodiment, the controller 110 generates the throttling signal if one or more of the power stages 108 is detected as being faulty and disabled or if an overtemperature condition is detected. For example, the multiphase VR 104 may include one or more temperature sensors (not shown) for sensing the temperature of the power stages 108 during operation. The controller 110 includes OTP circuitry for monitoring the temperature sensor information and detecting whether one or more of the power stages 108 is operating at a temperature above a maximum operating temperature limit. In response to an overtemperature condition, the multiphase VR controller 110 generates the throttling signal and communicates the throttling signal to the processor 102 over the same physical line 120 used by the controller 110 for indicating to the processor 102 if a power stage 108 is detected as being faulty and disabled.

In another embodiment, the multiphase VR controller 110 generates the throttling signal also in response to an overvoltage condition (OVP), undervoltage condition (UVP) or an overcurrent condition (OCP). According to this embodiment, the controller 110 generates the throttling signal if one or more of the power stages 108 is detected as being faulty and disabled, or if an overcurrent condition is detected, or if an overvoltage condition is detected, or if an undervoltage condition is detected. For example, the multiphase VR controller 110 may include current sense and voltage sense circuitry. The current sense circuitry measures the phase currents iphx of the power stages 108. The controller 110 may include OCP circuitry for comparing the phase current measurements (Isen) to a maximum phase current limit. If one of the phase current measurements exceeds the maximum phase current limit, the OCP circuitry indicates an overcurrent condition exists. The voltage sense circuitry measures the input voltage Vin of the multiphase VR 104. The controller 110 may include OVP circuitry for comparing the input voltage measurement to a maximum input voltage limit. If the input voltage measurement exceeds the maximum voltage limit, the OVP circuitry indicates an overvoltage condition exists. The controller 110 may include UVP circuitry for comparing the input voltage measurement to a minimum input voltage limit. If the input voltage measurement is below the minimum voltage limit, the UVP circuitry indicates an undervoltage condition exists. An undervoltage condition typically occurs when the input power supply capability is exceeded, resulting in a brownout condition.

In response to an overcurrent condition, an overvoltage condition or an undervoltage condition, the multiphase VR controller 110 generates the throttling signal and communicates the throttling signal to the processor 102 over the same physical line 120 used by the controller 102 for indicating to the processor if a power stage 108 is detected as being faulty and disabled.

In another embodiment, the multiphase VR controller 110 includes temperature, current and voltage sense circuitry. According to this embodiment, the multiphase VR controller 110 generates the throttling signal if one or more of the power stages 108 is detected as being faulty and disabled, or if an overtemperature, overvoltage, undervoltage or overcurrent condition is detected. The controller 110 communicates the throttling signal to the processor 102 over the same physical line 120 used by the controller 102 for indicating to the processor 102 if a power stage 108 is detected as being faulty and disabled.

In the throttling signal embodiments described above, the multiphase VR controller 110 communicates the throttling signal to the processor 102 over the same physical line 120 regardless of the underlying condition which triggered generation of the throttling signal. The processor 102 is typically unaware of the underlying condition which triggered the throttling signal, and hence reacts the same way regardless of the condition detected by the multiphase VR controller 110.

Figure 2:
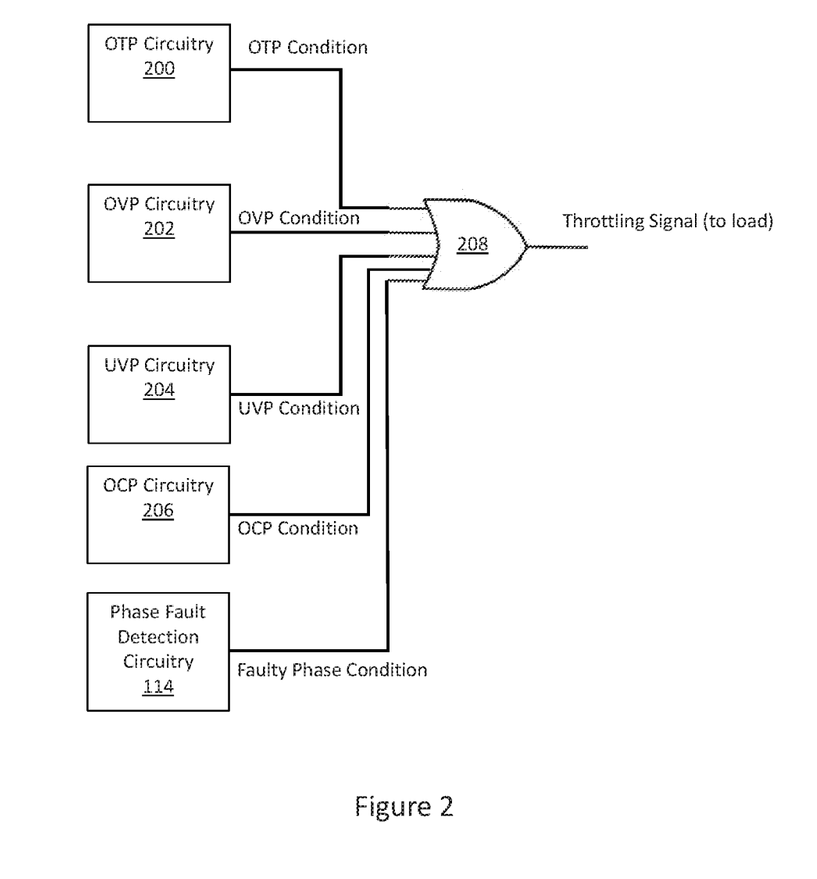
FIG. 2 illustrates a block diagram of an embodiment in which a controller of a multiphase voltage regulator includes phase fault detection circuitry, overtemperature protection circuitry, overcurrent protection circuitry, overvoltage protection circuitry and undervoltage protection circuitry which share the same physical line for throttling a processor load.

FIG. 2 illustrates an embodiment in which the multiphase VR controller 110 includes the phase fault detection circuitry 114 in addition to OTP circuitry 200, OVP circuitry 202, UVP circuitry 204 and OCP circuitry 206 described above. The outputs of the phase fault detection circuitry 114, the OTP circuitry 200, the OVP circuitry 202, the UVP circuitry 204 and the OCP circuitry 206 may be combined onto the same physical line 120, e.g., using an OR circuit 208 or similar circuit such as a multiplexer or other type of signal combiner.

The multiphase VR controller 110 may not include each of the OTP circuitry 200, the OVP circuitry 202, the UVP circuitry 204 and the OCP circuitry 206, and/or may include additional or different circuitry for detecting other types of conditions that warrant throttling of the processor 102. Utilizing the same physical line 120 for indicating all throttling conditions to the processor 102 avoids an increase in controller pin count, without degrading processor response time. This way, the number of I/O (input/output) pins of the VR controller 110 remains unchanged while providing the added functionality of throttling the processor 102 under a non-catastrophic power stage fault condition. The multiphase VR controller 110 may instead communicate the throttling signal generated to indicate if one or more of the power stages 108 is detected as being faulty and disabled over a physical line separate from the physical line 120 used to indicate other processor throttling conditions such as, but not limited to, overtemperature, overvoltage, undervoltage and/or overcurrent conditions.

As previously described herein, the multiphase VR controller 110 may continue to operate the multiphase VR 104 with reduced phase count and load throttling in the presence of a power stage failure. Load throttling, via a dedicated signal or bus 120 to the processor 102, may correspond to the processor 102 operating in a reduced functionality mode, thereby reducing the current/power demand placed on the multiphase VR 104. The reduced current/power demand is met by the multiphase VR 104 operating with one or more disabled power stages 108. By indicating the reduced phase capability of the multiphase VR 104 to the system manager 106 via independent signalling 116/118, the system manager 106 may reduce the computational load of the processor 102, may slow down the processor 102, and/or may shutdown the node with the reduced phase capability VR 104, thereby allowing the processor 102 to be operated under a reduced requirement or to be completely shut down. The system manager 106 communicates such directives independently to the processor 102 and the multiphase VR 104 with reduced phase capability. The independent communication interface 122 between the system manager 106 and the processor 102 is shown as a dashed line in FIG. 1, to indicate that this communication interface 122 may be a single line, a serial bus, or a parallel bus. By shifting resources away from the faulty node to another node, the system manager 106 allows for safe regulator shutdown without abruptly disrupting processor operation and/or allows for additional testing before resuming nominal operation.

The system manager 106 may direct the multiphase VR 104 which reported a faulty power stage 108 to enter a self-test mode to confirm whether any of the power stages 108 are indeed faulty. The controller 110 of the multiphase VR 104 responds by placing the multiphase VR 104 in the self-test mode, in which the processor 102 is operated at a known computational load and the controller 110 operates each power stage 108 independently to determine if any of the power stages 108 is faulty under the known computational load. The computational load of the processor 102 may be increased if the multiphase VR 104 indicates the self-test mode confirmed none of the power stages 108 are indeed faulty. This way, the multiphase VR 104 is afforded an opportunity to recover from an intermittent fault, glitchy reporting of a fault which actually did not occur, or other conditions which triggered reporting of a faulty power stage 108 but from which the multiphase VR 104 may recover from by shutting down and repowering up. Conversely, the system manager 106 may shut down the processor 102 and the corresponding multiphase VR 104 if the multiphase VR controller 110 indicates the self-test mode confirmed that one or more of the power stages 108 is indeed faulty.

Figure 3:
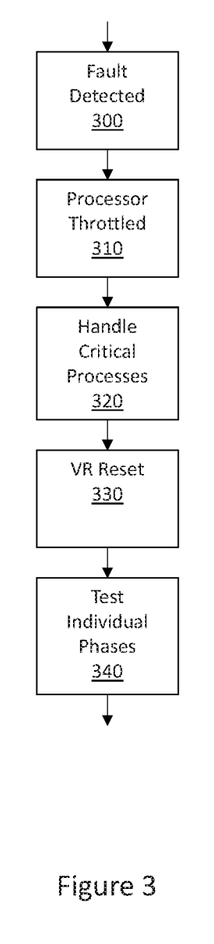
FIG. 3 illustrates a flow diagram of an embodiment of tasks executed by a multiphase voltage regulator, corresponding processor and a system manager leading up to an during a self-test mode for verifying one or more faulty power stages of the multiphase voltage regulator.

FIG. 3 illustrates an embodiment of the tasks executed by the multiphase VR 104, processor 102 and system manager 106 leading up to an during the self-test mode. Prior to entering self-test mode, the controller 110 of the multiphase VR 104 detects and disables a faulty power stage 108, generates a throttling signal to indicate that one or more of the power stages 108 is detected as being faulty and disabled, and communicates the throttling signal to the corresponding processor 102 over a physical line 120 running between the processor 102 and the controller 110 (Block 300), e.g., as previously described herein. In response to the throttling signal, the processor 102 throttles its operation (Block 310), e.g., by reducing clock speed. The system manager 106, in response to independent communication 116/118 from the multiphase VR controller 110 indicating the multiphase VR 104 is operating with a reduced number of power stages 108, instructs the processor 102 to complete any remaining critical processes or shifts the critical processes to another node in the system 100 (Block 320). The system manager 106 may or may not instruct the multiphase VR 104 to reset after the critical processes are completed or shifted to another node (Block 330). If the system manager 106 instructs the multiphase VR 104 to reset, the multiphase VR 104 is afforded an opportunity to cool down before testing the individual power stages 108. In either case, the multiphase VR controller 110 tests each individual power stage 108 separately, to confirm whether any of the power stages 108 are indeed faulty (Block 340). For example, a test (known) load may be applied and phase and processor operation are verified. If no fault is detected, the load may be increased and the verification test repeated.

The self-test mode allows the system manager 106 to confirm whether a hard or intermittent power stage failure has occurred, and to react accordingly. This way, the multiphase VR 104 operating with a reduced phase count may be stress-tested under controlled conditions to verify whether the power stages 108 are capable of operating within a nominal operating range. The self-test mode is typically entered during a diagnostic routine performed after a fault is reported. Separately or in combination, the self-test mode may be entered at powerup. If the multiphase VR system 104 has advanced detection capabilities, the controller 110 may report a high number of false alarms. The self-test mode allows the system manager 106 to verify whether a hard or intermittent power stage failure has occurred, before taking the corresponding node offline. If the diagnostic test executed as part of the self-test mode indicates one or more power stages 108 has a hard fault, the system manager 106 may shut down the corresponding node so that the multiphase VR 104 can be serviced.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A fault-tolerant multiphase voltage regulator, comprising:
   a plurality of power stages, each of which is configured to deliver a phase current to a processor; and
   a controller configured to:
   control the plurality of power stages to regulate an output voltage provided to the processor;
   detect and disable a faulty power stage;
   generate a throttling signal to indicate that one or more of the power stages is faulty and disabled;
   communicate the throttling signal to the processor over a physical line running between the processor and the controller; and
   place the multiphase voltage regulator in a self-test mode in which the processor is operated at a known computational load and the controller operates each power stage independently to determine if any of the power stages is faulty under the known computational load.

2. The fault-tolerant multiphase voltage regulator of claim 1, wherein the controller is configured to communicate with a system manager independent of communicating with the processor, to indicate to the system manager that one or more power stages of the plurality of power stages is detected as being faulty and disabled.

3. The fault-tolerant multiphase voltage regulator of claim 1, wherein the controller is configured to generate the throttling signal also in response to an overtemperature condition, so that the throttling signal is generated and communicated to the processor over the same physical line used by the controller to indicate to the processor that any of the following conditions occur:
   a power stage is detected as being faulty and disabled; and
   an overtemperature condition.

4. The fault-tolerant multiphase voltage regulator of claim 1, wherein the controller is configured to generate the throttling signal also in response to an overvoltage condition, an undervoltage condition or an overcurrent condition, so that the throttling signal is generated and communicated to the processor over the same physical line used by the controller to indicate to the processor that any of the following conditions occur:
   one or more of the plurality of power stages is detected as being faulty and disabled;
   the overvoltage condition;
   the undervoltage condition; and
   the overcurrent condition.

5. The fault-tolerant multiphase voltage regulator of claim 1, wherein the controller is configured to generate the throttling signal also in response to an overtemperature condition, an overvoltage condition, an undervoltage condition or an overcurrent condition, so that the throttling signal is generated and communicated to the processor over the same physical line used by the controller to indicate to the processor that any of the following conditions occur:
   one or more of the plurality of power stages is detected as being faulty and disabled;
   the overtemperature condition;
   the overvoltage condition;
   the undervoltage condition; and
   the overcurrent condition.

6. A method of operating a fault-tolerant multiphase voltage regulator having a plurality of power stages, each of which is configured to deliver a phase current to a processor, the method comprising:
   controlling the plurality of power stages to regulate an output voltage provided to the processor;
   detecting and disabling a faulty power stage;
   generating a throttling signal to indicate that one or more of the power stages is faulty and disabled;
   communicating the throttling signal to the processor over a physical line running between the processor and the controller; and
   placing the multiphase voltage regulator in a self-test mode in which the processor is operated at a known computational load and each power stage is operated independently to determine if any of the power stages is faulty under the known computational load.

7. The method of claim 6, further comprising:
communicating with a system manager independent of communicating with the processor, to indicate to the system manager that one or more power stages of the plurality of power stages is detected as being faulty and disabled.

8. The method of claim 6, further comprising:
generating the throttling signal also in response to an overtemperature condition, so that the throttling signal is generated and communicated to the processor over the same physical line used to indicate to the processor that any of the following conditions occur:
a power stage is detected as being faulty and disabled; and
an overtemperature condition.

9. The method of claim 6, further comprising:
generating the throttling signal also in response to an overvoltage condition, an undervoltage condition or an overcurrent condition, so that the throttling signal is generated and communicated to the processor over the same physical line used to indicate to the processor that any of the following conditions occur:
one or more of the plurality of power stages is detected as being faulty and disabled;
the overvoltage condition;
the undervoltage condition; and
the overcurrent condition.

10. The method of claim 6, further comprising:
generating the throttling signal also in response to an overtemperature condition, an overvoltage condition, an undervoltage condition or an overcurrent condition, so that the throttling signal is generated and communicated to the processor over the same physical line used to indicate to the processor that any of the following conditions occur:
one or more of the plurality of power stages is detected as being faulty and disabled;
the overtemperature condition;
the overvoltage condition;
the undervoltage condition; and
the overcurrent condition.

11. A fault-tolerant power distribution system, comprising:
a processor;
a multiphase voltage regulator comprising a plurality of power stages, each of which is configured to deliver a phase current to the processor, and a controller configured to:
control the plurality of power stages to regulate an output voltage provided to the processor;
detect and disable a faulty power stage;
generate a throttling signal to indicate that one or more of the power stages is faulty and disabled; and
communicate the throttling signal to the processor over a physical line running between the processor and the controller; and
a system manager in independent communication with the multiphase voltage regulator and the processor, the system manager configured to direct the multiphase voltage regulator to perform a self-test mode to confirm whether any of the power stages are faulty.

12. The fault-tolerant power distribution system of claim 11, wherein the system manager is configured to reduce a computational load of the processor responsive to the controller of the multiphase voltage regulator indicating one or more power stages of the plurality of power stages is detected as being faulty and disabled.

13. The fault-tolerant power distribution system of claim 12, wherein the system manager is configured to increase the computational load of the processor after the multiphase voltage regulator reports a faulty power stage, shuts down and repowers up again.

14. The fault-tolerant power distribution system of claim 11, wherein the system manager is configured to increase the computational load of the processor responsive to the multiphase voltage regulator indicating the self-test mode confirmed none of the power stages are faulty.

15. The fault-tolerant power distribution system of claim 11, wherein the system manager is configured to shut down the processor and the multiphase voltage regulator responsive to the multiphase voltage regulator indicating the self-test mode confirmed that one or more of the power stages is faulty.

16. A method of operating a fault-tolerant power distribution system having a processor, a multiphase voltage regulator comprising a plurality of power stages, each of which is configured to deliver a phase current to the processor, and a system manager in independent communication with the multiphase voltage regulator and the processor, the method comprising:
controlling the plurality of power stages at the multiphase voltage regulator to regulate an output voltage provided to the processor;
detecting and disabling a faulty power stage at the multiphase voltage regulator;
generating a throttling signal at the multiphase voltage regulator to indicate that one or more of the power stages is faulty and disabled;
communicating the throttling signal from the multiphase voltage regulator to the processor over a physical line running between the processor and the controller;
managing a computational load of the processor by the system manager based on feedback from the processor and the multiphase voltage regulator; and
directing, via the system manager, the multiphase voltage regulator to perform a self-test mode to confirm whether any of the power stages are faulty.

17. The method of claim 16, wherein managing the computational load of the processor by the system manager comprises:
reducing the computational load of the processor responsive to the multiphase voltage regulator indicating one or more power stages of the plurality of power stages is detected as being faulty and disabled.

18. The method of claim 17, further comprising:
increasing, via the system manager, the computational load of the processor after the multiphase voltage regulator reports a faulty power stage, shuts down and repowers up again.

19. The method of claim 16, further comprising:
increasing, via the system manager, the computational load of the processor responsive to the multiphase voltage regulator indicating the self-test mode confirmed none of the power stages are faulty.

20. The method of claim 16, further comprising:
shutting down the processor and the multiphase voltage regulator, via the system manager, responsive to the multiphase voltage regulator indicating the self-test mode confirmed that one or more of the power stages is faulty.

* * * * *